US012093353B2

(12) United States Patent
Ghorbani

(10) Patent No.: US 12,093,353 B2
(45) Date of Patent: Sep. 17, 2024

(54) SYSTEMS AND METHODS FOR USER AUTHENTICATION

(71) Applicant: Shopify Inc., Ottawa (CA)

(72) Inventor: Siavash Ghorbani, Toronto (CA)

(73) Assignee: Shopify Inc., Ottawa (CA)

( * ) Notice: Subject to any disclaimer, the term of this patent is extended or adjusted under 35 U.S.C. 154(b) by 685 days.

(21) Appl. No.: 17/012,866

(22) Filed: Sep. 4, 2020

(65) Prior Publication Data

US 2022/0075850 A1 Mar. 10, 2022

(51) Int. Cl.
G06F 21/31 (2013.01)
G06F 9/54 (2006.01)
G06F 16/957 (2019.01)
G06F 21/12 (2013.01)
G06Q 30/0601 (2023.01)

(52) U.S. Cl.
CPC .............. *G06F 21/31* (2013.01); *G06F 9/542* (2013.01); *G06F 16/9577* (2019.01); *G06F 21/128* (2013.01); *G06Q 30/0633* (2013.01); *G06Q 30/0641* (2013.01)

(58) Field of Classification Search
CPC ...... G06F 21/31; G06F 16/9577; G06F 9/542; G06F 21/128; G06Q 30/0633; G06Q 30/0641
See application file for complete search history.

(56) References Cited

U.S. PATENT DOCUMENTS

| | | | |
|---|---|---|---|
| 9,262,642 B1 | 2/2016 | Roth et al. | |
| 9,781,106 B1 * | 10/2017 | Vitus | G06F 21/316 |
| 10,218,695 B1 * | 2/2019 | Jain | H04L 63/102 |
| 10,313,881 B2 * | 6/2019 | Liu | G06F 21/31 |
| 10,706,132 B2 * | 7/2020 | Lindemann | H04L 63/20 |
| 11,080,385 B1 * | 8/2021 | Angara | H04W 12/068 |
| 11,288,346 B1 * | 3/2022 | Zubovsky | G06F 21/31 |
| 2001/0044896 A1 * | 11/2001 | Schwartz | H04L 63/12 |
| | | | 713/169 |
| 2002/0072980 A1 * | 6/2002 | Dutta | G06Q 30/0633 |
| | | | 705/26.8 |

(Continued)

OTHER PUBLICATIONS

Bangdao, Chen, and A. W. Roscoe. "Mobile electronic identity: securing payment on mobile phones." IFIP International Workshop on Information Security Theory and Practices. Springer, Berlin, Heidelberg, 2011. (Year: 2011).

*Primary Examiner* — Saleh Najjar
*Assistant Examiner* — Devin E Almeida
(74) *Attorney, Agent, or Firm* — Rowand LLP

(57) ABSTRACT

Methods and systems for user authentication. At a server, receiving unique fingerprint information for an unauthenticated browsing session with the server by a first user device. The unique fingerprint information received is compared with respective historical fingerprint information associated with a plurality of user accounts stored on the server. Based on the comparison, determining that one of the plurality of user accounts has associated historical fingerprint information that matches the unique fingerprint information with at least a threshold confidence level. In response to receiving user input from a second device indicating that the unauthenticated browsing session corresponds to the one of the plurality of user accounts, associating the unauthenticated browsing session with the one of the plurality of user accounts.

20 Claims, 7 Drawing Sheets

(56) References Cited

U.S. PATENT DOCUMENTS

| | | | |
|---|---|---|---|
| 2003/0184589 A1* | 10/2003 | Yamada | G06F 21/31 |
| | | | 715/781 |
| 2007/0016954 A1 | 1/2007 | Choi | |
| 2013/0219479 A1 | 8/2013 | DeSoto | |
| 2016/0063471 A1* | 3/2016 | Kobres | G06Q 20/40 |
| | | | 705/18 |
| 2016/0212115 A1* | 7/2016 | Hamlin | H04L 63/105 |
| 2016/0285911 A1* | 9/2016 | Goldman | H04L 63/08 |
| 2017/0372310 A1 | 12/2017 | Narasimhan | |
| 2019/0065724 A1* | 2/2019 | Dudley | G06F 21/35 |
| 2019/0272025 A1* | 9/2019 | Turgeman | G06F 3/04812 |
| 2020/0394331 A1* | 12/2020 | Talwar | G06F 21/6245 |
| 2021/0105620 A1 | 4/2021 | Navarro | |
| 2021/0168422 A1 | 6/2021 | Jaspers | |
| 2021/0201275 A1 | 7/2021 | Annamalai | |
| 2022/0351156 A1 | 11/2022 | Ghorbani | |

\* cited by examiner

SYSTEMS AND METHODS FOR USER AUTHENTICATION

FIELD

The present disclosure relates to user authentication and, in particular, to systems and methods for user authentication on e-commerce platforms.

BACKGROUND

A shopper may browse an online store and may even build a shopping cart, all without needing to authenticate as a registered user. When the shopper proceeds to check out, they are often prompted to sign in. Signing in can involve providing credentials, such as a user name and a password, that are entered on a webpage of the online store. Once a shopper has signed in, the store may be customized for that shopper. For example, checkout webpages may include saved payment methods for ease of checkout and ads may be better targeted to that particular shopper.

BRIEF DESCRIPTION OF THE DRAWINGS

Embodiments will be described, by way of example only, with reference to the accompanying figures wherein.

DETAILED DESCRIPTION

Figure 1:
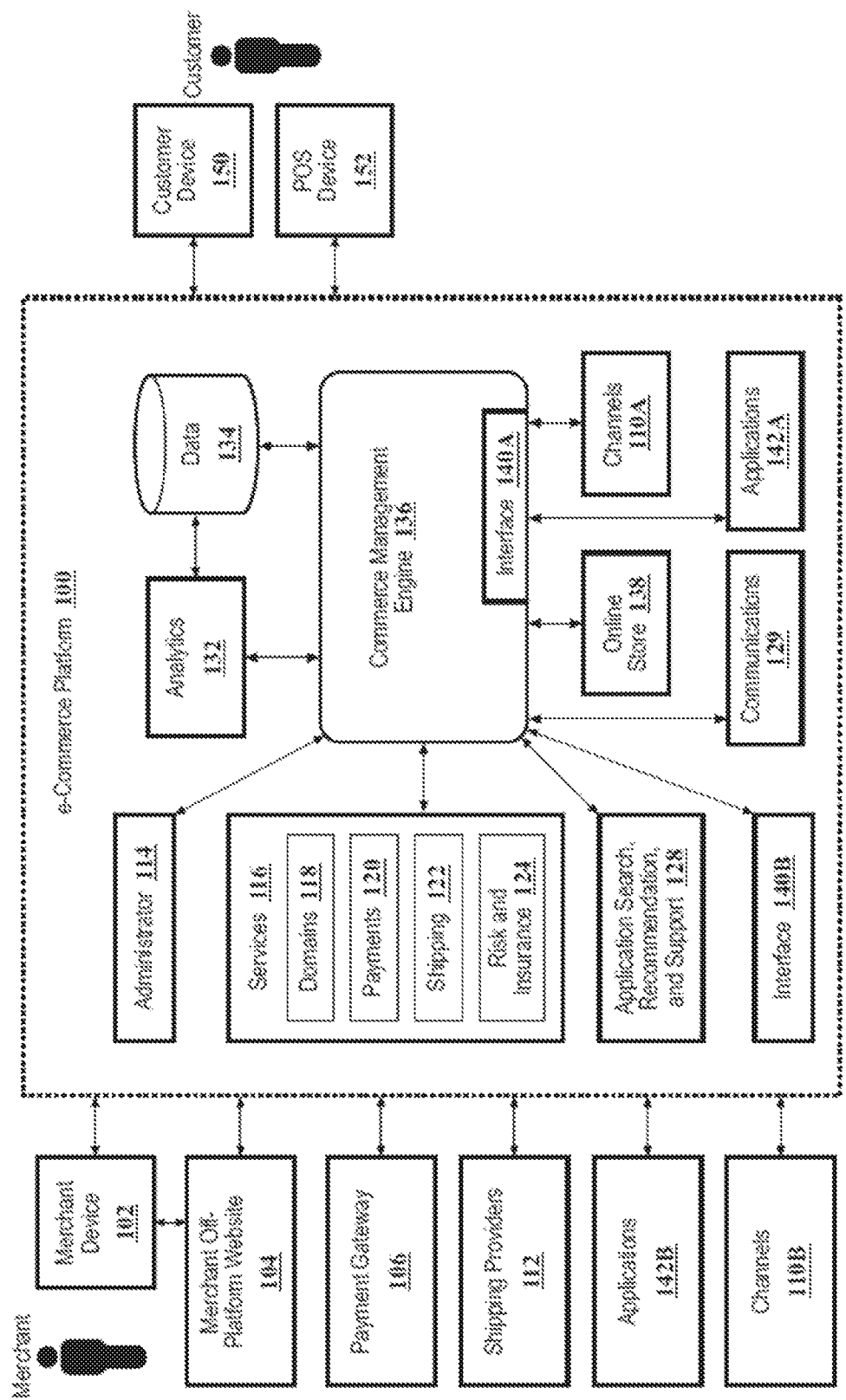
FIG. 1 is a block diagram of an e-commerce platform, according to one embodiment.

In one aspect, the present application describes a method of user authentication. The method may include receiving, at a server, unique fingerprint information for an unauthenticated browsing session with the server by a first user device; comparing the unique fingerprint information received with respective historical fingerprint information associated with a plurality of user accounts stored on the server; determining, based on the comparison, that one of the plurality of user accounts has associated historical fingerprint information that matches the unique fingerprint information with at least a threshold confidence level; and in response to receiving user input from a second device indicating that the unauthenticated browsing session corresponds to the one of the plurality of user accounts, associating the unauthenticated browsing session with the one of the plurality of user accounts.

In some implementations, the unique fingerprint information includes one or more product selections.

In some implementations, comparing the unique fingerprint information received with respective historical fingerprint information includes comparing the one or more product selections to one or more product selections included in the respective historical fingerprint information.

In some implementations, the unique fingerprint information includes an online shopping cart.

In some implementations, the unique fingerprint information includes a device location associated with the first device.

In some implementations, the unique fingerprint information includes a user identifier associated with a third-party website.

In some implementations, the second device is associated with the one of the plurality of user accounts.

In some implementations, associating the browsing session with the one of the plurality of user accounts transitions the unauthenticated browsing session to an authenticated browsing session without receiving user login credentials from the first user device or the second user device during the browsing session.

In some implementations, the method includes transmitting an actionable notification to the second device in response to the determination.

In some implementations, the notification is transmitted using a telephone number associated with the one of the plurality of user accounts.

In another aspect, the present application describes a system that includes a processor and a memory. The memory stores computer-executable instructions that, when executed by the processor, are to cause the processor to: receive unique fingerprint information for an unauthenticated browsing session with the server by a first user device; compare the unique fingerprint information received with respective historical fingerprint information associated with a plurality of user accounts stored on the server; determine, based on the comparison, that one of the plurality of user accounts has associated historical fingerprint information that matches the unique fingerprint information with at least a threshold confidence level; and in response to receiving user input from a second device indicating that the unauthenticated browsing session corresponds to the one of the plurality of user accounts, associate the unauthenticated browsing session with the one of the plurality of user accounts.

In some implementations, the unique fingerprint information includes one or more product selections.

In some implementations, the instructions to compare the unique fingerprint information received with respective historical fingerprint information are to cause the processor to compare the one or more product selections to one or more product selections included in the respective historical fingerprint information.

In some implementations, the unique fingerprint information includes an online shopping cart.

In some implementations, the unique fingerprint information includes a device location associated with the first device.

In some implementations, the unique fingerprint information includes a user identifier associated with a third-party website.

In some implementations, the second device is associated with the one of the plurality of user accounts.

In some implementations, the instructions to associate the browsing session with the one of the plurality of user accounts are to cause the processor to transition the unauthenticated browsing session to an authenticated browsing session without receiving user login credentials from the first user device or the second user device during the browsing session.

In some implementations, the instructions, when executed by the processor, are to cause the processor to transmit an actionable notification to the second device in response to the determination.

In another aspect, the present application discloses a non-transitory computer-readable medium storing processor-executable instruction that, when executed by one or more processors, are to cause the one or more processors to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

For illustrative purposes, specific example embodiments will now be explained in greater detail below in conjunction with the figures.

Example E-Commerce Platform

In some embodiments, the methods disclosed herein may be performed on or in association with an e-commerce platform. An example of an e-commerce platform will now be described.

FIG. 1 illustrates an e-commerce platform 100, according to one embodiment. The e-commerce platform 100 may be used to provide merchant products and services to customers. While the present disclosure contemplates using the apparatus, system, and process to purchase products and services, for simplicity the description herein will refer to products. All references to products throughout this disclosure should be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g. a seller, retailer, wholesaler, or provider of products), a customer-user (e.g. a buyer, purchase agent, or user of products), a prospective user (e.g. a user browsing and not yet committed to a purchase, a user evaluating the e-commerce platform 100 for potential use in marketing and selling products, and the like), a service provider user (e.g. a shipping provider 112, a financial provider, and the like), a company or corporate user (e.g. a company representative for purchase, sales, or use of products, an enterprise user, a customer relations or customer management agent, and the like), an information technology user, a computing entity user (e.g. a computing bot for purchase, sales, or use of products), and the like.

The e-commerce platform 100 may provide a centralized system for providing merchants with online resources and facilities for managing their business. The facilities described herein may be deployed, in part or in whole, through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g. a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g. "brick-and-mortar" retail stores), a merchant off-platform website 104 (e.g. a commerce Internet website or other internet or web property or asset supported by or on behalf of the merchant separately from the e-commerce platform), and the like. However, even such other merchant commerce facilities may be incorporated into the e-commerce platform, such as where POS devices 152 in a physical store of a merchant are linked to the e-commerce platform 100, where a merchant off-platform website 104 is tied to the e-commerce platform 100, such as through "buy buttons" that link content from the merchant off platform website 104 to the online store 138, and the like.

The online store 138 may represent a multitenant facility comprising a plurality of virtual storefronts. In some embodiments, merchants may manage one or more storefronts in the online store 138, such as through a merchant device 102 (e.g. computer, laptop computer, mobile computing device, and the like), and offer products to customers through a number of different channels 110A-B (e.g. an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure, the terms "online store" and "storefront" may be used synonymously to refer to a merchant's online e-commerce offering presence through the e-commerce platform 100, where an online store 138 may refer to the multitenant collection of storefronts supported by the e-commerce platform 100 (e.g. for a plurality of merchants) or to an individual merchant's storefront (e.g. a merchant's online store).

In some embodiments, a customer may interact through a customer device 150 (e.g. computer, laptop computer, mobile computing device, and the like), a POS device 152 (e.g. retail device, a kiosk, an automated checkout system, and the like), or any other commerce interface device known in the art. The e-commerce platform 100 may enable merchants to reach customers through the online store 138, through POS devices 152 in physical locations (e.g. a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g. accessed by users using a client, such as a thin client, via a web browser or other application, accessed through by POS devices, and the like). In some embodiments, elements of the e-commerce platform 100 may be implemented to operate on various platforms and operating systems, such as iOS™, Android™, on the web, and the like (e.g. the administrator 114 being implemented in multiple instances for a given online store for iOS™, Android™, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150, and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g. add products to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store 138 may implement a content management system for website content. Merchants may author blog posts or static pages and publish them to their online store 138, such as through blogs, articles, and the like, as well as configure navigation menus. Merchants may upload images (e.g. for products), videos, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g. through an e-commerce platform shipping facility or through a third-party shipping carrier), such as providing merchants with real-time updates, tracking, automatic rate calculation, bulk order preparation, label printing, and the like.

Figure 2:
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store, POS devices, and/or a buy button. The administrator 114 may also include interfaces for managing applications installed on the merchant's account, and settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g. days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g. a card server), to reconcile financials, bill merchants, perform automated clearing house (ACH) transfers between an e-commerce platform 100 financial institution account and a merchant's bank account (e.g. when using capital), and the like. These systems may have Sarbanes-Oxley Act (SOX) compliance and a high level of diligence required in their development and operation. The financial facility 120 may also provide merchants with financial support, such as through the lending of capital (e.g. lending funds, cash advances, and the like) and provision of insurance. In addition, the e-commerce platform 100 may provide for a set of marketing and partner services and control the relationship between the e-commerce platform 100 and partners. They may also connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation, and data management to enable support and services to the plurality of online stores 138 (e.g. related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services. The applications 142A may be provided internal to the e-commerce platform 100 or applications 142B may be provided from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g. sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion in the commerce management engine 136 may need to exceed a core functionality threshold through which it may be determined that the function is core to a commerce experience (e.g. common to a majority of online store activities, such as across channels, administrator interfaces, merchant locations, industries, product types, and the like), is re-usable across online stores 138 (e.g. functions that can be re-used/modified across core functions), limited to the context of a single online store 138 at a time (e.g. implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a rapid and accurate checkout. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. Thus, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g. that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g. app: "engine, surface my app data in mobile and web admin using the embedded app SDK"), and/or where the commerce management engine 136 is able to ask the application to perform work on demand (e.g. engine: "app, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as by utilizing APIs to expose the functionality and data available through and within the commerce management engine 136 to the functionality of applications (e.g. through REST, GraphQL, and the like). For instance, the e-commerce platform 100 may provide API interfaces 140A-B to merchant and partner-facing products and services, such as application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g. as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g. merchandising, inventory, discounts, fulfillment, and the like) and online store tasks (e.g. applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over or be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, for synchronizing a local database, notifying an external integration partner, and the like. Update events may enable this functionality without having to constantly poll the commerce management engine 136 to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g. via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128 functionalities. Application search, recommendation and support 128 may include developer products and tools to aid in the development of applications, an application dashboard (e.g. to provide developers with a development interface, to administrators for management of applications, to merchants for customization of applications, and the like), facilities for installing and providing permissions with respect to providing access to an application 142A-B (e.g. for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized for application development performed by any entity, including the merchant developing their own application 142A-B, a third-party developer developing an application 142A-B (e.g. contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g. through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g. the online store, applications for flash sales (e.g. merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g. through applications related to the web or website or to mobile devices), run their business (e.g. through applications related to POS devices), to grow their business (e.g. through applications related to shipping (e.g. drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g. a "default variant" is created for a product without any options). To facilitate browsing and management, products may be grouped into collections, provided product identifiers (e.g. stock keeping unit (SKU)) and the like. Collections of products may be built by either manually categorizing products into one (e.g. a custom collection), by building rulesets for automatic classification (e.g. a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g. for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g. in an abandoned checkout feature). For those reasons, checkouts can have much longer lifespans than carts (hours or even days) and are therefore persisted. Checkouts may calculate taxes and shipping rates based on the customer's shipping address. Checkout may delegate the calculation of taxes to a tax component and the calculation of shipping rates to a delivery component. A pricing component may enable merchants to create discount codes (e.g. "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g. a set of prerequisites that when met imply a set of entitlements). For instance, prerequisites may be items such as "the order subtotal is greater than $100" or "the shipping rate is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency, or a store of value (such as dollars or a cryptocurrency) to and from customers and merchants. Communication with the various payment providers (e.g. online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g. where the customer is redirected to another website), manually (e.g. cash), online payment methods (e.g. online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g. order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts, to avoid over-selling (e.g. merchants may control this behavior from the inventory policy of each variant). Inventory reservation may have a short time span (e.g. minutes) and may need to be very fast and scalable to support flash sales (e.g. a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order, or incoming from an inventory transfer component (e.g. from a vendor).

The merchant may then review and fulfill (or cancel) the order. A review component may implement a business process merchants use to ensure orders are suitable for fulfillment before actually fulfilling them. Orders may be fraudulent, require verification (e.g. ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g. credit card information) or wait to receive it (e.g. via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g. at merchant managed locations) used when the merchant picks and packs the products in a box, purchase a shipping label and input its tracking number, or just mark the item as fulfilled. A custom fulfillment service may send an email (e.g. a location that doesn't provide an API connection). An API fulfillment service may trigger a third party, where the third-party application creates a fulfillment record. A legacy fulfillment service may trigger a custom API call from the commerce management engine 136 to a third party (e.g. fulfillment by Amazon). A gift card fulfillment service may provision (e.g. generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. Conditions may be imposed on returns, such as requiring that they be initiated within a set period (e.g. 30 days) of the original order date. The business process merchants may go through to "un-sell" an item may be implemented by a return component. Returns may consist of a variety of different actions, such as: a re-stock, where the product that was sold actually comes back into the business and is sellable again; a refund, where the money that was collected from the customer is partially or fully returned; an accounting adjustment noting how much money was refunded (e.g. including if there was any restocking fees, or goods that weren't returned and remain in the customer's hands); and the like. A return may represent a change to the contract of sale (e.g. the order), and where the e-commerce platform 100 may make the merchant aware of compliance issues with respect to legal obligations (e.g. with respect to taxes). In some embodiments, the e-commerce platform 100 may enable merchants to keep track of changes to the contract of sales over time, such as implemented through a sales model component (e.g. an append-only date-based ledger that records sale-related events that happened to an item).

Anonymous Browsing

E-commerce platforms often allow a customer to browse an online store without requiring the customer to authenticate as a registered user. The anonymous browser may even perform actions such as adding products to an online shopping cart. Because the user is unauthenticated, the platform may be unable to provide store customizations such as targeted ads and checkout webpages that are pre-populated with saved account information. An anonymous browser may authenticate with the platform by providing credentials. However, credentials are often forgotten and users may need to take steps to regain access to their user account.

User Identification and Authentication

To reduce delay and speed the purchase transaction, the platform may attempt to identify the anonymous user as likely being a registered user based on their interactions with the platform. If identified with a sufficiently high confidence, the platform may prompt the user through a separate user device (associated with the registered user account) different from the one being used to browse the site to confirm that they are, in fact, anonymously browsing the online store. If user confirmation is received on the second device, then the user may be automatically signed on to the platform on the first device without requiring the input of credentials.

In one solution, when an unauthenticated user of a first device visits a website hosted on a server, the server may track electronic fingerprint information associated with that visit and associate it with a unique ID. The server may compare the fingerprint information of the visit with the historical fingerprint information associated with each user account associated with the website. If a user account is identified with a confidence that meets a threshold confidence level that the fingerprint information corresponds to the user account, then the server may send a notification to a device associated with the user account. The notification may cause that second device to prompt for user input confirming the identity of the unauthenticated user (i.e. confirming that they were the one taking the actions described). If the server receives a positive confirmation message from the second device, then the server may automatically sign the user in to the server on the first device without receiving user login credentials associated with the user account from the first device or from the second device during the browsing session. Signing the user into the server may involve associating the electronic fingerprint information (as identified with the unique ID) with the user account, and granting the user access to server resources associated with the user account.

In the present application, the term "authentication" refers generally to verifying the identity of a user. Authentication may be performed in order to provide a user with access to secure resources that user has authority to access. Secure resources may include, for example, information or services associated with a user account associated with the user.

The term "authenticated browsing session" may refer generally to a browsing session in which the identity of the user that is browsing has been verified by the server. In a typical situation, the user is verified by the server through receiving and authenticating user login credentials, which may include a user name and password combination, biometric information, or other credential data. Conversely, the term "unauthenticated browsing session" may refer generally to a browsing session in which the identity of the user that is browsing has been not verified by the server.

Figure 3:
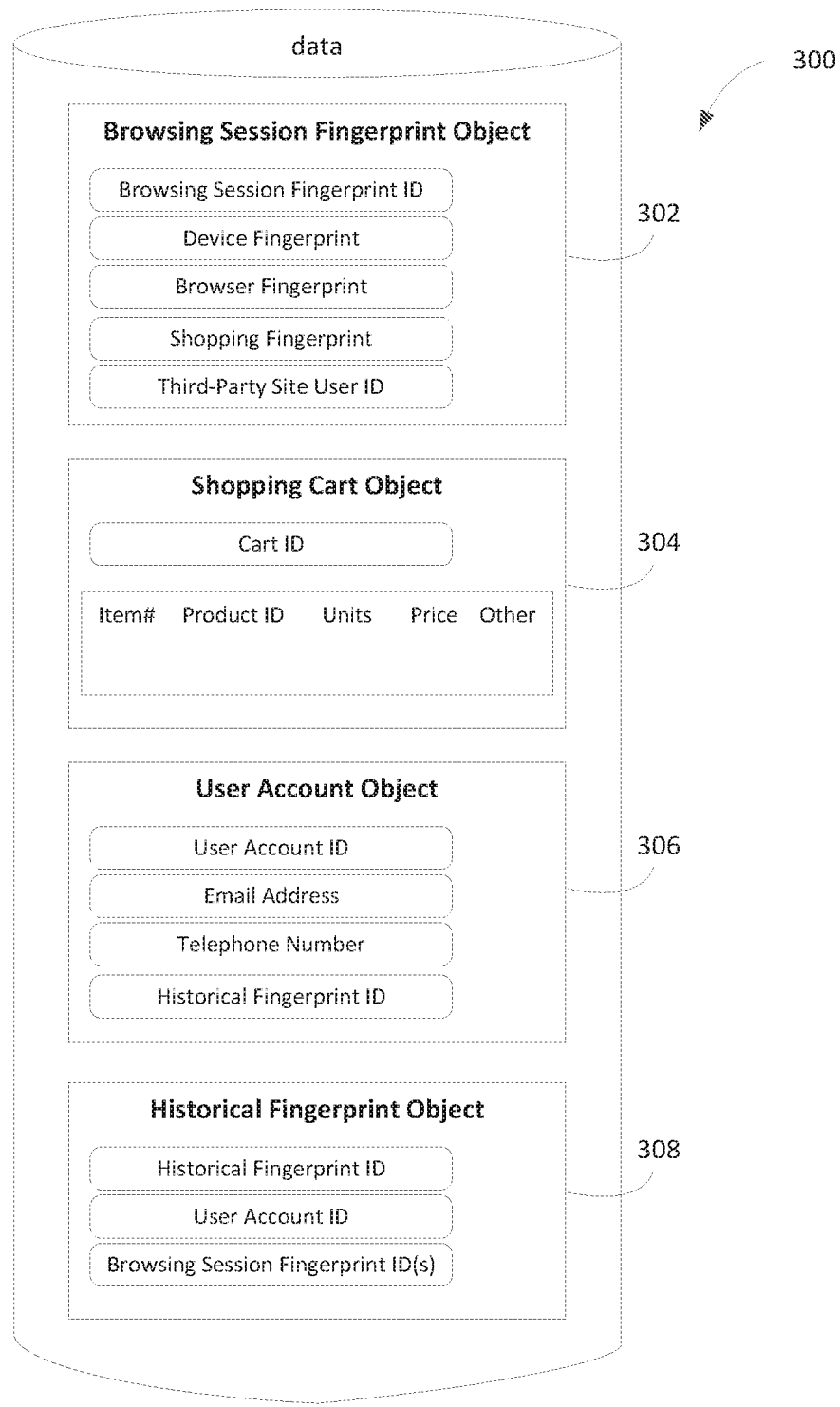
FIG. 3 shows, in block diagram form, an example data facility of an e-commerce platform, according to one embodiment.

Reference is now made to FIG. 3, which partially illustrates an example data facility 300 of an e-commerce platform in block diagram form. The data facility may be a data facility 134 of the example e-commerce platform 100 of FIG. 1 or a data facility external to an e-commerce platform. Not all components of the data facility 300 are illustrated. The data facility 300 may include one or more data storage units. In some cases, the data storage may be in database format and may include one or more databases. The databases may be relational databases in some examples. The data facility 300 is illustrated as a single unit for ease of illustration, but may include a plurality of storage units.

The data facility 300 may store data regarding a fingerprint associated with a browsing session in a browsing session fingerprint object 302. The browsing session fingerprint object 302 may be a data structure and may include details regarding a browsing session. Example details include a device fingerprint, browser fingerprint, biometric fingerprint, shopping fingerprint and a user ID associated with a third-party website.

A device fingerprint may include details about the software and hardware of a customer device. Example details include the IP address of a device, the MAC address of a device, a software identifier or license number, or other such identifying details.

A browser fingerprint may include details about a browser and the hardware the browser is installed on, and may be used to identify a particular installation instance of a browser application. Example details include the product name and version of the browser, the name and version of the operating system that the browser is installed on, a list of active plugins (e.g. an advertisement blocking plugin), list of fonts, list of cookies, time zone setting, screen size, screen resolution, screen ratio, screen color depth, device model, scripting capabilities and/or a canvas fingerprint. A browser fingerprint may also include the location of the device that the browser is installed on. The location may be a geographic address (e.g., street address) and/or a geolocation, which may include a latitude, longitude and altitude.

A browser fingerprint may further include a browsing history of websites and/or webpages that have been visited by a browser application. The browsing history may include a list of one or more domain names and/or uniform resource identifiers (URIs), sometimes called web addresses, corresponding to the visited websites and/or webpages. The history may include visits to social media websites and/or visits to other stores on the e-commerce platform. A browsing history may be tracked by a consumer device using any suitable tracking technique, including cookie based tracking techniques using first-party cookies and/or third-party cookies.

A browser fingerprint may further include referrer information, which may include the web address of a previous webpage from which a link to the currently requested webpage was followed. For example, the referrer may be a web address of a webpage, such as a social media or webmail webpage, that provides a click-through link to the requested webpage.

A shopping fingerprint may include details about a browsing session associated with an online store, and may be used to identify a shopper browsing that store. Example details include an online store identifier, a cart identifier, which may link to a shopping cart object 304, one or more products selected for inclusion in a cart, the type and/or category of product(s) included in a cart, one or more products and/or product categories that have been browsed during the browsing session, a language identifier indicating the language in which a requested webpage is displayed, a currency identifier indicating the currency for price data, search data for querying the data facility, one or more order identifiers, which may link to respective order records, a user identifier and/or account identifier.

Fingerprint information may also include an identifier associated with a third-party website. For example, a third-party website may include a referral link to a website hosted on the server. An unauthenticated browsing session may be launched by clicking the link. The selected link may pass a unique identifier associated with a user of the third-party website. The unique identifier may be a social media handle or a user name on the third-party website. Examples may include a Facebook user ID, Instagram user name, Twitter account handle, and Flickr ID.

The data facility 300 may also store one or more timestamps associated with the browsing session fingerprint object 302. A timestamp may, for example, indicate when the associated browsing session commenced or when the browsing session fingerprint object 302 was created or last modified.

The data facility 300 may store data regarding a shopping cart associated with a browsing session in a shopping cart object 304. The shopping cart object 304 may be a data structure and may include a cart identifier and product details. The product details may include a product identifier or code, a quantity, any applicable parameters specified for the product and not already implied by the product identifier or code, and price data.

Since the expected lifespan of a browsing session fingerprint object 302 and shopping cart object 304 may be in the order of minutes (not days), browsing session fingerprint objects 302 and shopping cart objects 304 may be persisted to an ephemeral (e.g., temporary) data store.

The data facility 300 may store data regarding customers associated with the e-commerce platform in a plurality of respective user account objects 306. The user account object 306 may be a data structure and may include details regarding a user. Example details include a unique user account identifier (ID), identification information (e.g., full name), contact information (e.g., phone number, email address, street address), sign in credentials (e.g., user name and password), shipping information (e.g., a shipping address), billing information (e.g., a billing address), payment information (e.g., details of one or more credit cards, including credit card numbers and), wishlist information (e.g., a list of products the user would like to purchase in a future transaction), preferences (e.g. preferred language identifier, preferred currency identifier), one or more order identifiers, which may link to respective order records also stored in the data facility 300, and a historical fingerprint identifier, which may link to a historical fingerprint object 308.

The data facility 300 may further store data regarding a plurality of historical fingerprint objects 308. The historical fingerprint object 308 may be a data structure and may include details regarding fingerprint information received in association with a previous browsing session that had been associated with a user account. Example details include a historical fingerprint identifier, a user account identifier, which may link to a user account object 306, and one or more fingerprint identifiers, which may link to respective browsing session fingerprint objects 302 for respective previous authenticated browsing sessions associated with the user account identifier. In some implementations, when a browsing session fingerprint object 302 is linked to a historical fingerprint object 308, the linked browsing session fingerprint object 302 and associated shopping cart object 304 may be moved from ephemeral storage to persistent storage. Alternatively, the historical fingerprint object 308 may contain the information otherwise stored in a browsing session fingerprint object 302. For example, the historical fingerprint object 308 may be populated during an authenticated browsing session as fingerprint information is gathered, and/or may be based on an unauthenticated browsing session fingerprint object 302 where the user later provides their credentials thereby linking the fingerprint to their account.

Figure 4:
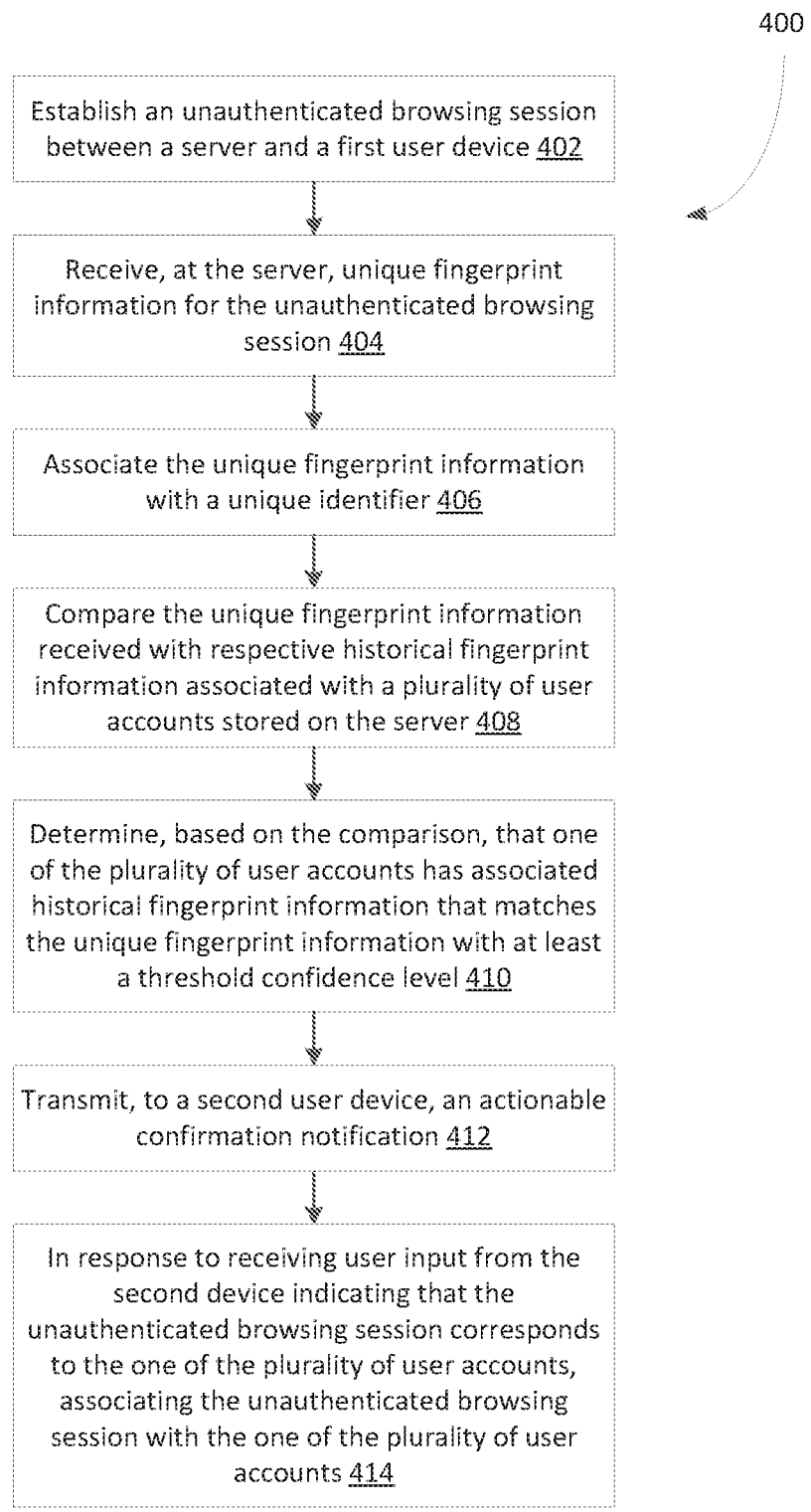
FIG. 4 shows, in flowchart form, an example method of user authentication, according to one embodiment.

Reference is now made to FIG. 4, which shows, in flowchart form, an example method 400 for user authentication. In this example method 400, the described operations may be carried out by a server, such as a server of the example e-commerce platform 100 of FIG. 1. The server is configured to communicate with the data facility 300, and receive or respond to communications from a first user device and a second user device. The first user device may be implemented by a customer device, such as customer device 150 of FIG. 1. The second user device may be implemented by the same device as the first user device or by a distinct device. However, a server implementation in an e-commerce platform is only one example. The operations may also be implemented on any device or server, as a stand-alone component or service that is external to an e-commerce platform. In some embodiments, the operations may be provided as a cloud computing service, a software as a service (SaaS), and the like, in the form a downloadable application that is available for installation in relation with an on-line store (or a merchant account) or in the form of a downloadable application available for installation by a customer. Other possibilities exist.

In operation 402, the server establishes an unauthenticated browsing session with the first user device. The browsing session may begin when the server receives a request from the first user device. For example, when a user visits a website hosted on the server, a browser application on the first user device may generate an HTTP request to retrieve a webpage for the website. Upon receiving the request, the server may generate a unique session identifier and send back the requested webpage along with the session identifier.

In operation 404, the server receives from the first user device unique fingerprint information for the unauthenticated browsing session. This information may be used to identify a user account that uniquely corresponds to the browsing session.

In operation 406, the server associates the received unique fingerprint information with a unique identifier. In some embodiments, the unique identifier may be a session identifier or a unique identifier that is generated for use in association with the received fingerprint information.

In operation 408, the server compares the unique fingerprint information received with respective historical fingerprint information associated with the plurality of user accounts.

In operation 410, the server determines, based on the comparison, that one of the plurality of user accounts has associated historical fingerprint information that matches the unique fingerprint information with at least a threshold confidence level. The one of the plurality of user accounts may be referred to as the matched account or the user account that matches the browsing session.

Both the comparison of the fingerprint information and the determination of a match account may occur in real-time as the unique fingerprint information is received by the server. For example, when an initial HTTP request is received from the first user device with an IP address associated with that device, the server may, in response, automatically compare that IP address with historical fingerprint information and determine a matched account. In some cases, the initial request may include insufficient fingerprint information to determine a matched account. However, subsequent requests from the first user device may provide further fingerprint information. The receipt of additional fingerprint information by the server may trigger further the comparison and the operations for determining a matched account.

In some embodiments, the comparison and determination operations may be triggered by user input received via the second user device. Examples of trigger events include user input received, via an actionable user interface element, for adding a product to a cart, proceeding to checkout, or purchasing a particular product immediately.

In operation 412, the server may transmit a confirmation notification to a second user device based on the result of the comparison. If the threshold confidence level has been reached, a notification may be sent in real-time that is indicative of this result. Otherwise, no notification may be sent.

The transmission of the notification may be performed in accordance with any suitable means of communication. In some embodiments, the communication may be implemented using a messaging paradigm, such as email, text message, instant message, automated telephone call, or messaging to an application relating to the matched account. Information of the matched user account may be used to transmit the notification to the second user device. In some embodiments, the server may transmit the notification to the second user device using an email address and/or a telephone number associated with the matched account.

The notification may be provided in different forms and the message of the notification may vary. The notification may include information of the matched user account, such as the account identifier. The notification may also include received fingerprint information or information that is obtained or generated using received fingerprint information. In some embodiments, the notification may include received fingerprint information in a format familiar to a user of the second user device. For example, the notification may include a store name or website name corresponding to a store or website identifier, a product name corresponding to a received product identifier in a cart, and/or a street address corresponding to a received geolocation.

The matched user account may be associated with the second user device. For instance, the second user device may be configured with information of the matched user account in order to receive notifications from the server. In some embodiments, the second user device may include an email application that is configured to receive emails addressed to an email address of the matched account. The second user device may also be configured to receive text messages and telephone calls at a telephone number of the matched account. In some embodiments, the second user device may be configured to receive a notification via an application that relates to the matched account and is installed on the second user device. The application may be, for example, a shopping application that is configured with credentials (e.g. a username and password) of the matched account for authenticating the application with the server. The server may transmit the notification to the authenticated shopping application.

The second user device may present the notification to a user of the second user device via a user interface. The user interface may be that of a messaging application, such as an email application, text and/or voice message application, instant message application, or an application relating to the matched account. In some embodiments, the user interface may be a graphical user interface that presents the notification via pop-up, alert, or in any other suitable manner.

The notification may be actionable, such as through a selectable link or other actionable user interface element, to either directly indicate a user selection or to navigate to a website, webpage, application interface, or other user interface through which the user is prompted to indicate a user selection. The selection offered through the notification and/or interface is whether to confirm the second order or cancel the second order.

The notification may prompt for user input confirming the identity of the user engaged in the unauthenticated browsing session. More particularly, the notification may prompt for input confirming that the user of the second user device is, in fact, browsing the website on the first user device (i.e. confirming that they were the one taking the action described by the prompt). The user interface may include a message that is provided by the notification or is generated based on the notification. As an example, the message may be "Are you currently browsing on John's Apparel?" or "Are you currently browsing John's Apparel on another device. Would you like to log in?", wherein John's Apparel is the name of an online store.

The second user device may receive user input in response. In some embodiments, the user interface may provide one or more user selectable options for responding to the notification. The selectable options may include a first option for indicating a positive response and/or a second option for indicating negative response. The first and/or second option may be presented as a link, button or other actionable user interface element and may include text. By way of example, the text for the first option may be "Yes" or "Yes, log me in" and the text for the second option may be "No" or "No, that's not me". In some embodiments, the second user device may receive user input in the form of text that contains keywords, for example "yes" or "no", that are used to classify the input as a positive or negative response.

A positive response may confirm that the user providing the input is also browsing a website specified in the notification, whereas negative response may indicate that the user is not currently browsing on that website. In this way, the user input may confirm that the unauthenticated browsing session corresponds to the matched account. In some embodiments, a positive response may be a command for the server to transition, using the matched account, the browsing session from an unauthenticated state to an authenticated state.

In some embodiments, when the server receives no response within a predetermined period of time, the notification may be resent using different contact information in the matched user account or a different messaging paradigm.

In operation 414, the server receives user input from the second user device indicating that the unauthenticated browsing session corresponds to the one of the plurality of user accounts. In response to receiving this user input, the server associates the unauthenticated browsing session with the one of the plurality of user accounts. In particular, the server may associate the session identifier with an account identifier associated with the matched account. The association of the browsing session with the user account may transition the unauthenticated browsing session to an authenticated browsing session. In other words, the browsing session may be transitioned from an unauthenticated state to an authenticated state.

In this way, a user is able to automatically sign in to the server on the first user device without requiring the input of credentials in the first or second user device. Generally, the method of FIG. 3 may reduce delay and speed operations that require user authentication, such as the purchase of products on an online store, since the server does not need to prompt for user credentials and wait while the user recalls and inputs their credentials.

Once the browsing session is authenticated, the browsing session is provided with the authority associated with the matched account. In addition, the historical fingerprint information associated with the matched account may be updated to include the unique fingerprint information received. Further fingerprint information that is received during the authenticated browsing session may also be included in the historical fingerprint information. Such further fingerprint information may include order, billing, shipping and wishlist information.

The method 400 of FIG. 4 may, in some cases, be modified to use a secondary form of authentication based on the confidence level in the recognition of the unique fingerprint information. More particularly, use of a secondary form of authentication may be based on the confidence level in operation 410 that the one of the plurality of user accounts has associated historical fingerprint information that matches the unique fingerprint information. Furthermore, the method 400 may be modified to select, based on the confidence level, one of a plurality of secondary forms of authentication to be used.

The secondary form of authentication may, for example, be text message-based. In text message-based authentication, a numeric or alphanumeric password, sometimes referred to as a personal identification number (PIN) or a PIN code, may be sent to a user device for subsequent use by a user of that device to confirm their identity. The password may be a random password that is generated by the server. The text message may be sent via a short message service (SMS) or any other suitable text message service.

In one example implementation, the operation 414 of FIG. 4 may be modified to use a secondary form of authentication. In operation 414, the server receives user input from the second user device indicating that the unauthenticated browsing session corresponds to the one of the plurality of user accounts. In response to receiving this user input, the server may use a secondary form of authentication. If the secondary form of authentication is successful, then the server associates the unauthenticated browsing session with the one of the plurality of user accounts.

In some embodiments, in response to receiving this user input, if a threshold confidence level is met, then the server associates the unauthenticated browsing session with the one of the plurality of user accounts without using the secondary form of authentication. But if the threshold confidence level is not met, then the secondary form of authentication is used. Those skilled in the art will recognize that the threshold confidence level for determining whether to use the secondary form of authentication may be higher than the threshold used for determining whether to send the confirmation notification in operation 412 of the method 400 of FIG. 4.

The method 400 of FIG. 4 may, in some cases, be varied to include using a first secondary form of authentication if the confidence level is greater than a first threshold, and using a second secondary form of authentication if a second threshold, but not the first threshold, confidence level is met. In some examples, if the confidence level is sufficiently high and meets a third threshold, then no secondary form of authentication may be used.

The second secondary form of authentication may be more cumbersome or complex than the first secondary form of authentication and/or may provide a greater level of security than the first secondary form of authentication. For example, the first secondary form of authentication may use a PIN that is a four-digit numerical code and the second secondary form of authentication may use a PIN that is an eight-digit numerical code. Put more generally, a password associated with the second secondary form of authentication may be longer than a password associated with the first secondary form of authentication. As another example, the first secondary form of authentication may use a reusable password and the second secondary form of authentication may use a one-time password (OTP). As yet another example, the first secondary form of authentication may use a reusable password or an OTP and the second secondary form of authentication may use a time-based one-time password (TOTP) or a hash-based message authentication code (HMAC) based one-time password (HOTP).

Conveniently, in this way, the secondary form of authentication can be used to "top up" or increase the confidence that the anonymous user is likely the registered user identified by the one of the plurality of user accounts. The lower the confidence level is for the matched account, the more of a complex, cumbersome or secure secondary form of authentication may be used.

Use of the secondary form of authentication may include sending, by the server a second notification, including a password for input at the first user device, to a third user device. The third user device may be the same device as the second user device or a different user device.

The second notification may be sent using the same means of communication as the confirmation notification, or may be sent using any other suitable means of communication. In some embodiments, the communication may be implemented using a messaging paradigm, such as email, text message, instant message, automated telephone call, or messaging to an application relating to the matched account. Information of the matched user account may be used to transmit the second notification to the third user device. In some embodiments, the server may transmit the notification to the third user device using an email address and/or a telephone number associated with the matched account.

The second notification may be provided in different forms and the message of the second notification may vary. The message may instruct the user to input the password via an interface of the first user device. More particularly, the message may instruct the user to input the password in a webpage associated with the unauthenticated browsing session, such as a login webpage. The server may receive user input from the first device indicating the password. In response to receiving user input from the first device including the password, the server may associate the unauthenticated browsing session with the one of the plurality of user accounts. Those skilled in the art will recognize that other modifications to the method 400 of FIG. 4 may be necessary.

Figure 5:
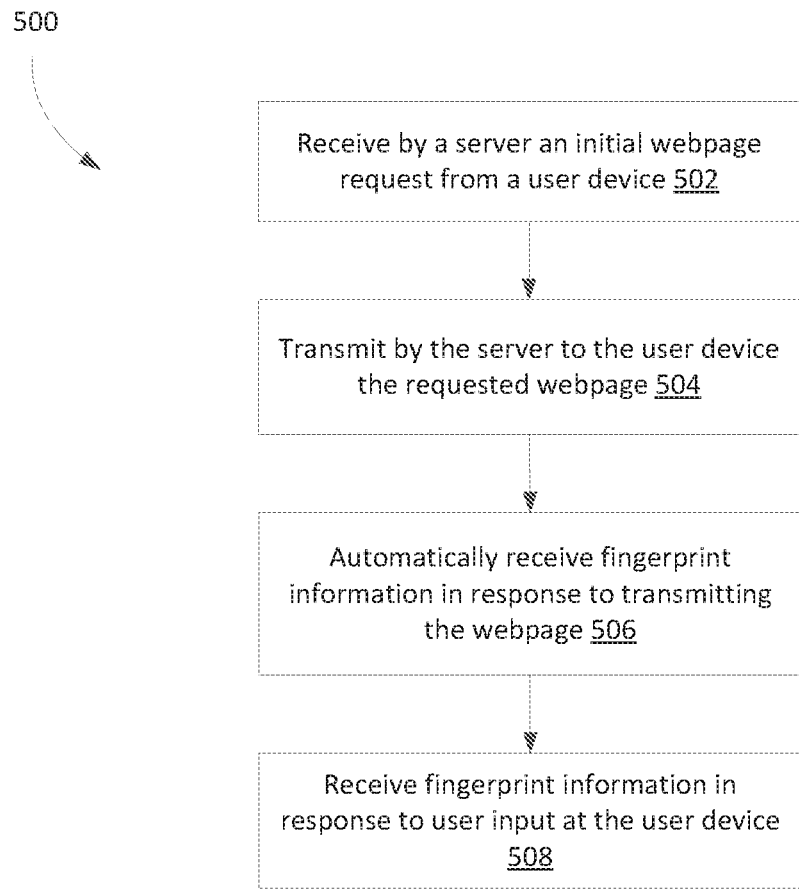
FIG. 5 shows, in flowchart form, an example method of receiving unique fingerprint information, according to one embodiment.

Reference is now made to FIG. 5, which shows, in flowchart form, an example method 500 for receiving fingerprint information from a user device. The example method 500 may correspond at least in part to an operation 404 of the method 400 of FIG. 4.

In operation 502, the server may receive an initial webpage request from a user device. For instance, the server may send out an email to a customer regarding their purchase order. A link on the order email may be invoked to launch the initial webpage request. The selected link may pass an order identifier or user identifier to the server. As another example, a third-party website may include a link to a website hosted on the server. When invoked, the link may pass to the server a user identifier associated with the third-party website. In these examples, the request parameters that are passed to the server, such as the order identifier or user identifier, may be fingerprint information. The initial webpage request may also include device fingerprint information, such as the IP address associated with the user device.

In operation 504, the server may transmit to the user device the requested webpage. The requested webpage may be presented as a graphical user interface associated with the browser application. In some embodiments, the interface is an online store interface. The online store interface may include a graphical user interface (GUI) element relating to adding a product to a cart, adding a product to a wishlist, viewing details of a product, or viewing the products in a product category. Selection of such an element may result in transmission of a command or message to the server to add the product selection to the cart, add the product selection to the wishlist, respond with details about the product selection, or respond with a list of products in the product category, respectively. The online store interface may further include a GUI element relating to selecting the language or currency of the interface. Selection of such an element may result in transmission of a command or message to the server to retransmit the current webpage in the selected language or currency, and/or to set user preferences relating to a preferred language or currency. A GUI element may be presented using any suitable user interface element, including an icon, button, link, menu option, dropdown list option or other actionable user interface element. The user interface element may be invoked or selected based on user input received at a user device. The online store interface may further include a search bar for receiving user input of search data for querying a data facility.

In operation 506, the server may automatically receive fingerprint information in response to transmitting the webpage. When the user device receives the webpage, the browser application installed on the user device may load the webpage and automatically execute a script that is included in the webpage. The script may obtain, from the browser application, information about the device and the browser, and automatically send this information to the server as device and/or browser fingerprint information.

In some implementations, the user device may include a satellite navigation device, sometimes referred to as a global positioning system (GPS) receiver, that is capable of receiving information from satellites and which may be used to determine a geolocation for that device. The device location may be included in the device fingerprint information sent by the script.

In operation 508, the server may receive fingerprint information in response to user input received via the interface of the transmitted webpage. As an example, user input may be received at the webpage interface that selects a product to add to a shopping cart or wishlist. The received fingerprint information may include the product selection. The product selection may be received in association with a product identifier. The product identifier may be a SKU or other code. The product selection may be stored in memory in a shopping cart object 304 of the data facility 300 of FIG. 3. The product selection may be edited, added to, or cancelled before checkout. In this way, the server may receive a shopping cart that is built through one or more requests to add and remove products to and from a cart.

The received fingerprint information may further include a language selection and/or a currency selection. The language and currency selections may be received in association with a language identifier and a currency identifier, respectively. The language selection may be used by the server to generate a response to the first client device that includes text that is at least in part in the selected language. The currency selection may be used by the server to generate a response to the first client device that includes price data in the selected currency.

The received fingerprint information may be stored in memory and may include other attributes that may be stored in the browsing session fingerprint object 302 and shopping cart object 304 of the data facility 300 of FIG. 3.

Figure 6:
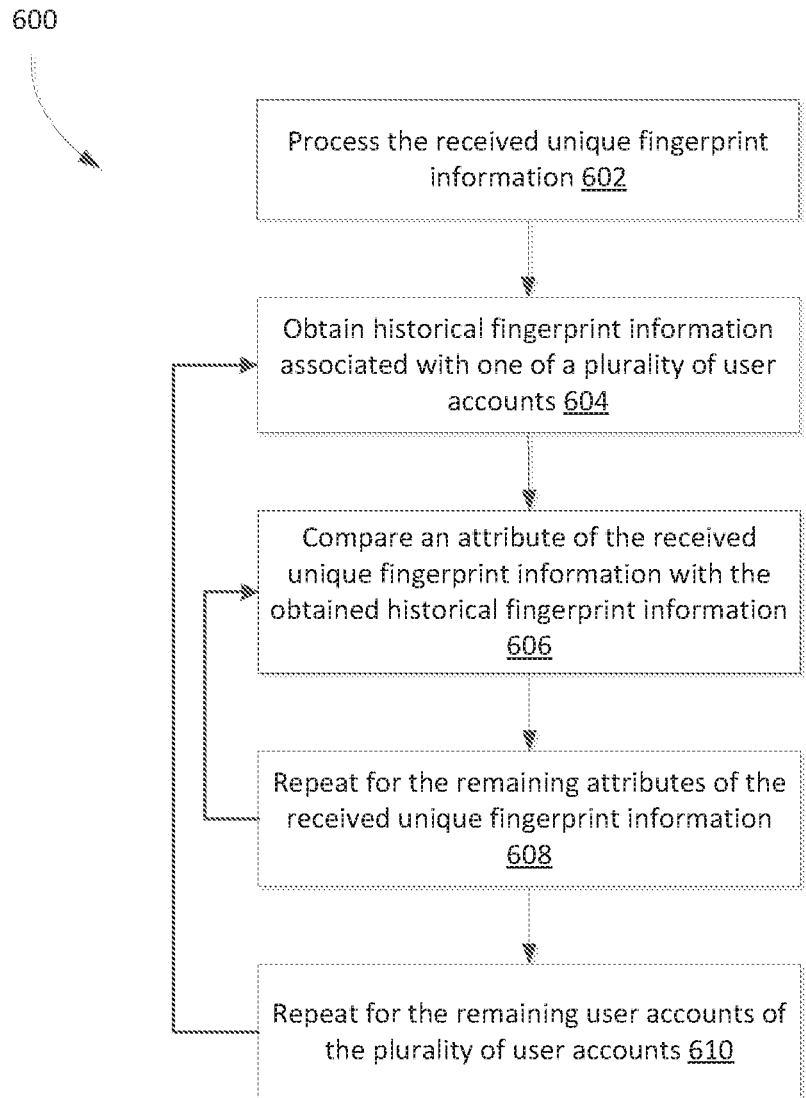
FIG. 6 shows, in flowchart form, an example method for comparing received unique fingerprint information with historical fingerprint information, according to one embodiment.

Reference is now made to FIG. 6, which shows, in flowchart form, an example method 600 for comparing unique fingerprint information with historical fingerprint information. The example method 600 may correspond to an operation 408 of the method 400 of FIG. 4. In this example method, the one or more attributes of the unique fingerprint information are compared with historical fingerprint information for a plurality of user accounts.

In operation 602, the received unique fingerprint information may be processed to facilitate the comparison and other operations. For example, an IP address included in the unique fingerprint information may be used to lookup the "IP address location" of a user device. The IP address location may include a geolocation, a country, state/province, city and postal/zip code, and may be stored in the browsing session fingerprint object in which the received unique fingerprint information is stored. In some embodiments, the received unique fingerprint information may be converted into another format or a standardized format. For example, geocoding may be used to convert an address, such as a street address, to geographic coordinates, such as latitude and longitude. Conversely, reverse geocoding may be used to convert geographic coordinates to an address.

In operation 604, historical fingerprint information associated with one of a plurality of user accounts is obtained. In some embodiments, a user account object may be retrieved and the historical fingerprint information may be accessed through an identifier found in the user account object.

In operation 606, the server compares an attribute of the received unique fingerprint information with one or more corresponding attributes of the obtained historical fingerprint information. Based on the comparison, a determination is made as to whether the attribute of the received unique fingerprint information matches the obtained historical fingerprint information.

An attribute of the received unique fingerprint information may be referred to as a received attribute, whereas an attribute of the obtained historical fingerprint information may be referred to as a historical attribute.

A received attribute may be said to correspond to a historical attribute if both attributes are of the same type or are counterparts of each other. For instance, if both attributes are IP addresses or both attributes are shopping cart objects.

In some embodiments, the received attribute may be said to match with the historical fingerprint information of the one of the plurality of user accounts when the received attribute matches any of the one or more corresponding historical attributes. In some embodiments, the received attribute may be said to match with the historical fingerprint information of the one of the plurality of user accounts when the received attribute matches each of the one or more corresponding historical attributes. The result of the comparison may be stored in memory.

In one example, the received attribute is an IP address of a user device associated with the current browsing session, and the one or more corresponding historical attributes are addresses of user devices associated with respective previous browsing sessions. If the received IP address matches any of the historical IP addresses, then the received IP address may be said to match with the historical fingerprint information of the one of the plurality of user accounts.

In another example, the received attribute is a shopping cart, and the one or more corresponding historical attributes are shopping carts associated with respective previous browsing sessions. The comparison may involve a comparison of product identifiers, product types, categories of products, quantities of products, and/or other shopping cart or product attributes. As an example of a comparison that involves product categories, if historical shopping carts collectively include the categories of products listed in the received shopping cart, then the result of the comparison may be a match.

In some embodiments, the comparison is based on the combination of products listed in the received shopping cart. For example, if one or more of the historical shopping carts individually include at least, or in some cases exactly, the combination of products listed in the received shopping cart, then the result may be a match. In other words, if the user associated with the one of the plurality of user accounts has previously added the combination of products listed in the received shopping cart to a shopping cart, then there is a match.

In some embodiments, the comparison is based on the individual products listed in the received shopping cart. For example, the individual products in the received shopping cart may be separately compared to the historical shopping carts. Some of the products may be found in one of the historical shopping carts, while the remaining products may be found in one or more of the other historical shopping carts. If each individual received product is found in at least one of the historical shopping carts, then there is a match. Put another way, if the products are found in a combination of the historical shopping carts, then there is a match. In other words, if the user associated with the one of the plurality of user accounts has previously added each of the products listed in the received shopping cart to the shopping cart at some point in the past, then there is a match.

As another example, a received shopping cart may be compared to one or more historical wishlists. In this case, similar comparisons may be performed as described in relation to the comparison between the received shopping cart and historical shopping carts.

In some embodiments, the received shopping cart may be compared to one or more historical orders. In this case, similar comparisons may be performed as described in relation to the comparison between the received shopping cart and historical shopping carts. For example, in some embodiments, if one or more of the historical orders individually include at least, or in some cases exactly, the combination of products listed in the received shopping cart, then the result may be a match. In other words, if the user associated with the one of the plurality of user accounts has previously purchased the combination of products listed in the received shopping cart to a shopping cart, then there is a match. As another example, in some embodiments, the individual products in the received shopping cart may be separately compared to the historical orders. If each individual received product is found in at least one of the historical orders, then there is a match. Put another way, if the products are found in a combination of the historical orders, then there is a match. In other words, if the user associated with the one of the plurality of user accounts has previously purchased each of the products listed in the received shopping cart, then there is a match.

By way of another example, a received store identifier may be compared to one or more historical orders. If the store identifier is found in at least one of the historical orders, then there is a match.

By way of another example, the received fingerprint information may include a plurality of store identifiers that may be compared to one or more historical orders. If the plurality of store identifiers are found in respective historical orders, then there is a match.

By way of another example, a received location may be compared to one or more historical locations. The received location may be a device location. In some cases, the historical locations may be either device locations, shipping addresses or billing addresses. When addresses are compared, the determination of a match may be based on whether the country, province/state, region, city, street and/or street number are the same. When geographic coordinates are compared, the distance between the coordinates may be calculated and compared to a threshold distance. If the threshold distance is not met, then there may be a match.

In operation 608, the operation 606 may be performed for other attributes of the received unique fingerprint that have not yet been compared.

In operation 610, the operations 604, 606 and 608 may be performed for the other user accounts in the plurality of user accounts. As a result of the comparisons, the server may determine that at least one of the plurality of user accounts is associated with historical fingerprint information that matches with at least one attribute of the unique fingerprint information. In this way, the server may determine that one or more of the plurality of user accounts have historical fingerprint information that matches or corresponds to the received unique fingerprint information.

Figure 7:
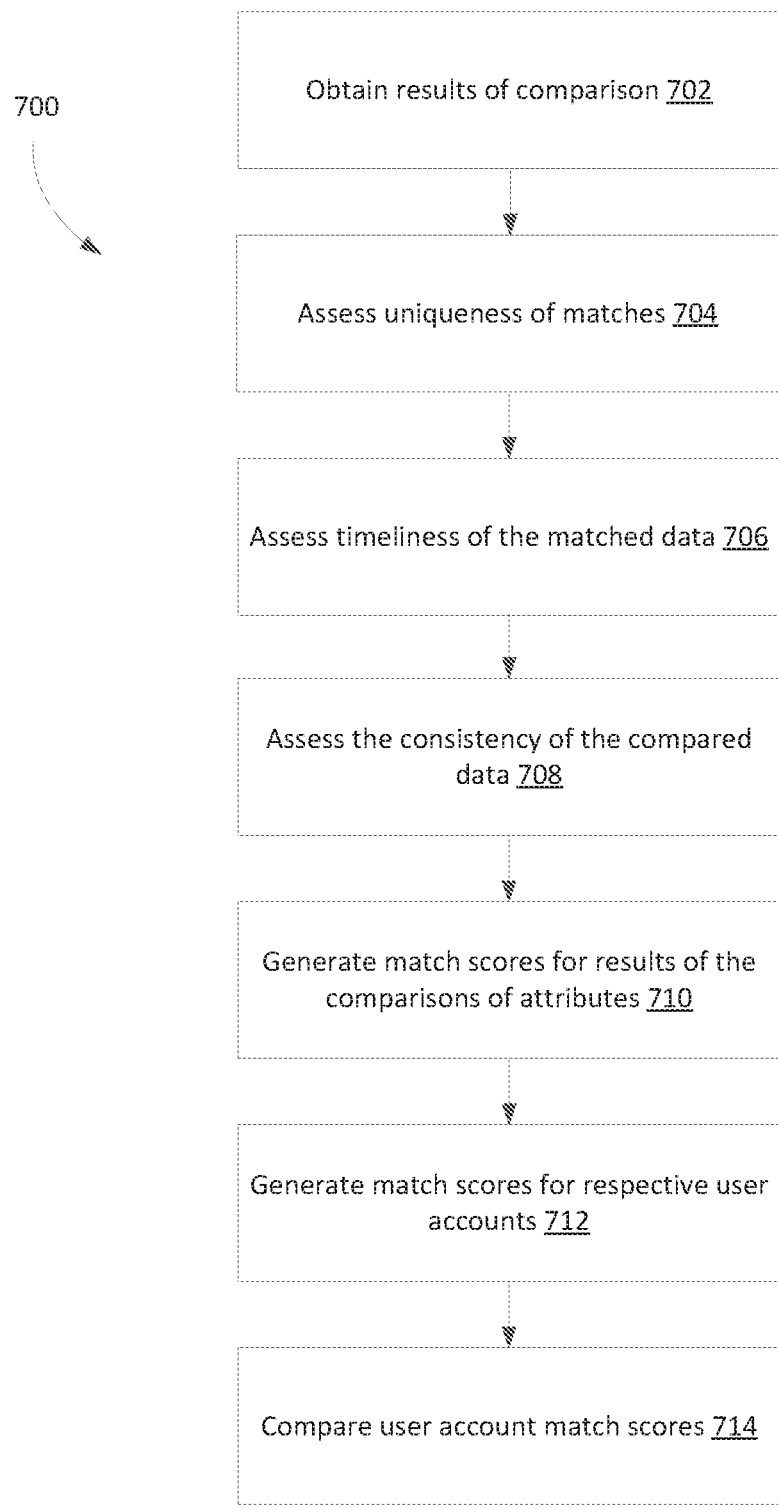
FIG. 7 shows, in flowchart form, an example method of identifying a user account that corresponds to received unique fingerprint information, according to one embodiment.

Reference is now made to FIG. 7, which shows, in flowchart form, an example method 700 for determining that one of a plurality of user accounts has associated historical fingerprint information that matches the unique fingerprint information with at least a threshold confidence level. The example method 700 may correspond to an operation 410 of the method 400 of FIG. 4. The determination made in method 700 may be based on the comparison in operation 408 of FIG. 4 or the method 600 of FIG. 6.

In operation 702, the server obtains the results of a comparison of the unique fingerprint information received with respective historical fingerprint information associated with a plurality of user accounts. The results may indicate matches or inconsistencies between the attributes of received unique fingerprint information and respective historical fingerprint information associated with a plurality of user accounts stored.

In method 700, the quality of each match identified by the comparisons may be assessed. The assessment may be based on a variety of factors. Some factors may be the uniqueness of the matched data, the timeliness of the matched data, and the consistency of the compared data. The matches, or the results of the comparisons, may be assigned match scores that are generated based on the quality assessments.

In operation 704, the server assesses the uniqueness of matches. Where the historical fingerprint information of only one of the plurality of user accounts matches with the received attribute, the match is unique and a higher match score may be assigned. For instance, where the received IP address matches with an IP address of the historical fingerprint information associated with one user account, and the historical fingerprint information associated with the other user accounts of the plurality of user accounts do not include that IP address, the match may be determined to be unique.

Put another way, the server may assess the frequency in which a received attribute matches with the historical fingerprint information associated with different user accounts. The match score may be inversely proportional to the number of user accounts that are associated with historical fingerprint information that matches with the received data.

In some embodiments, the server may assess the uniqueness of the matched data in the respective historical fingerprint information. If the matched data is common in the respective historical fingerprint information, the match score may be low. For instance, when many of the user accounts are associated with historical fingerprint information that include the received IP address, the matched data may be determined to be common and the match score may be lowered.

In operation 706, the server may assess the timeliness of the historical fingerprint information that matches. Historical fingerprint information may become stale over time and in some cases the server may determine that the historical fingerprint information that matches is stale. If the matched data is stale, then the match score may be lower.

For example, a dynamically assigned IP address may be assigned to a device belonging to a first user and may subsequently be reassigned to a device belonging to a second user. Accordingly, the same IP address may be included in respective historical fingerprint information associated with two user accounts. The server may determine that the IP address was included in the historical fingerprint information associated with the first user account before, and not after, the IP address was included in the historical fingerprint information associated with the second user account. Based on this determination, the server may determine that the IP address included in the historical fingerprint information associated with the first user account may be stale. A lower match score may be assigned to the match of the received IP address to the stale IP address included in the historical fingerprint information associated with the first user account.

In some embodiments, the assessment of the timeliness of the historical fingerprint information may be based on a threshold date or time. In some implementations, a historical fingerprint object may be linked to a browsing session fingerprint object that is associated with a timestamp that indicates the date of the browsing session. If the server determines that the timestamp falls before the threshold, the data stored in the browsing session fingerprint object may be considered to be stale. When a match is based on the stale data, the match score may be lower.

In operation 708, the server assesses the consistency of the received unique browser fingerprint with the historical fingerprint information for a user account. When information matches, it is considered "consistent". In contrast, when information conflicts, it is considered "inconsistent". In some cases, the match score is based on a comparison between the data that is consistent and the data that is inconsistent. If the proportion of consistent data is high, the match score may be high. In some embodiments, the greater the amount of data that conflicts, the lower the match score may be.

For instance, a received shopping cart may be compared with a historical shopping cart. The historical shopping cart may include the same products listed in the received shopping cart. To this extent, the shopping cart data may be considered consistent. However, the historical shopping cart may include additional products that are not listed in the received shopping cart. The data corresponding to the additional products may be considered inconsistent. The greater the number of the inconsistent products, the lower the match score may be. As another example, when a comparison shows that the received shopping cart includes a product or product category that the user has not browsed in a previous browsing session, the match score may also be lower.

In some embodiments, a match score may be negative when an attribute is inconsistent. For example, when the compared browser types are different, the match score for this comparison may be negative.

The level of confidence may also be lower depending on the type of attribute that is inconsistent, if any. For example, if the compared browser types are different, this may decrease the level of confidence.

In operation 710, a match score is generated for each of the results of the comparisons between the attributes of the received fingerprint and the respective historical fingerprint information. The match scores may be generated based on one or more of the quality assessments. In some embodiments, match scores are generated for comparisons where the result was a match, rather than for all of the results.

In operation 712, a match score is generated for each of the plurality of user accounts. The match score of a user account may be referred to as a "user account match score". A user account match score may be generated for a user account by summing the individual match scores generated in operation 710 relating to the results of comparisons with the historical fingerprint information associated with the user account.

In operation 714, the user account match scores are compared to determine that one of the plurality of user accounts has associated historical fingerprint information that matches the unique fingerprint information with at least a threshold confidence level. The user account match scores may be compared against each other and against a threshold score. In some embodiments, the threshold confidence level is met by the user account that has the highest user account match score. In some embodiments, the highest score must also meet a threshold score. In some embodiments, the highest score must also exceed the user account match scores of the other user accounts by at least a threshold amount.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A method of user authentication, the method comprising:
    receiving, at a server, credentialless unique fingerprint information for an unauthenticated browsing session with the server by a first user device, wherein the credentialless unique fingerprint information does not include a user credential;
    comparing the credentialless unique fingerprint information received with respective historical fingerprint information associated with a plurality of user accounts stored on the server, wherein the comparison includes a comparison of one or more product selections included in the credentialless unique fingerprint information with the respective historical fingerprint information;
    determining, based on the comparison, that one of the plurality of user accounts has associated historical fingerprint information that matches the credentialless unique fingerprint information with at least a threshold confidence level;
    in response to determining, based on the comparison, that one of the plurality of user accounts has associated historical fingerprint information that matches the credentialless unique fingerprint information with at least the threshold confidence level, transmitting a confirmation notification to a second device; and
    in response to receiving user input from the second device indicating that the unauthenticated browsing session corresponds to the one of the plurality of user accounts, associating the unauthenticated browsing session with the one of the plurality of user accounts.

2. The method of claim 1, wherein comparing the unique fingerprint information received with respective historical fingerprint information includes comparing the one or more product selections to one or more product selections included in the respective historical fingerprint information.

3. The method of claim 1, wherein the unique fingerprint information includes an online shopping cart.

4. The method of claim 1, wherein the unique fingerprint information includes a device location associated with the first device.

5. The method of claim 1, wherein the unique fingerprint information includes a user identifier associated with a third-party website.

6. The method of claim 1, wherein the second device is associated with the one of the plurality of user accounts.

7. The method of claim 1, wherein associating the browsing session with the one of the plurality of user accounts transitions the unauthenticated browsing session to an authenticated browsing session without receiving user login credentials from the first user device or the second user device during the browsing session.

8. The method of claim 1, wherein the confirmation notification is actionable.

9. The method of claim 1, wherein the notification is transmitted using a telephone number associated with the one of the plurality of user accounts.

10. A system comprising:
    a processor; and
    a memory storing computer-executable instructions that, when executed by the processor, are to cause the processor to:
        receive credentialless unique fingerprint information for an unauthenticated browsing session with the server by a first user device, wherein the credentialless unique fingerprint information does not include a user credential;
        compare the credentialless unique fingerprint information received with respective historical fingerprint information associated with a plurality of user accounts stored on the server, wherein the comparison includes a comparison of one or more product selections included in the credentialless unique fingerprint information with the respective historical fingerprint information;

determine, based on the comparison, that one of the plurality of user accounts has associated historical fingerprint information that matches the credentialless unique fingerprint information with at least a threshold confidence level;

in response to the determination, based on the comparison, that one of the plurality of user accounts has associated historical fingerprint information that matches the credentialless unique fingerprint information with at least the threshold confidence level, transmit a confirmation notification to a second device; and in response to receiving user input from the second device indicating that the unauthenticated browsing session corresponds to the one of the plurality of user accounts, associate the unauthenticated browsing session with the one of the plurality of user accounts.

11. The method of claim 1, further comprising, in response to determining that a second threshold, but not a first threshold, is met, using a secondary form of authentication, wherein the confidence level is a level of confidence that the one of the plurality of user accounts has associated historical fingerprint information that matches the credentialless unique fingerprint information.

12. The system of claim 10, wherein the instructions to compare the unique fingerprint information received with respective historical fingerprint information are to cause the processor to compare the one or more product selections to one or more product selections included in the respective historical fingerprint information.

13. The system of claim 10, wherein the unique fingerprint information includes an online shopping cart.

14. The system of claim 10, wherein the unique fingerprint information includes a device location associated with the first device.

15. The system of claim 10, wherein the unique fingerprint information includes a user identifier associated with a third-party website.

16. The system of claim 10, wherein the second device is associated with the one of the plurality of user accounts.

17. The system of claim 10, wherein the instructions to associate the browsing session with the one of the plurality of user accounts are to cause the processor to transition the unauthenticated browsing session to an authenticated browsing session without receiving user login credentials from the first user device or the second user device during the browsing session.

18. The system of claim 10, wherein the confirmation notification is actionable.

19. A non-transitory computer-readable medium storing processor-executable instructions that, when executed by one or more processors, are to cause the one or more processors to:

receive credentialless unique fingerprint information for an unauthenticated browsing session with the server by a first user device, wherein the credentialless unique fingerprint information does not include a user credential;

compare the credentialless unique fingerprint information received with respective historical fingerprint information associated with a plurality of user accounts stored on the server, wherein the comparison includes a comparison of one or more product selections included in the credentialless unique fingerprint information with the respective historical fingerprint information;

determine, based on the comparison, that one of the plurality of user accounts has associated historical fingerprint information that matches the credentialless unique fingerprint information with at least a threshold confidence level;

in response to the determination, based on the comparison, that one of the plurality of user accounts has associated historical fingerprint information that matches the credentialless unique fingerprint information with at least the threshold confidence level, transmit a confirmation notification to a second device; and in response to receiving user input from the second device indicating that the unauthenticated browsing session corresponds to the one of the plurality of user accounts, associate the unauthenticated browsing session with the one of the plurality of user accounts.

20. The method of claim 11, further comprising, in response to determining that a confidence level meets a threshold, associating the unauthenticated browsing session with the one of the plurality of user accounts without using a secondary form of authentication, wherein the confidence level is a level of confidence that the one of the plurality of user accounts has associated historical fingerprint information that matches the credentialless unique fingerprint information.

* * * * *